United States Patent
Chowdhury et al.

(10) Patent No.: US 7,535,011 B2
(45) Date of Patent: May 19, 2009

(54) QUANTITATIVE RADIATION DETECTION USING GEIGER MODE AVALANCHE PHOTODIODE BINARY DETECTOR CELL ARRAYS

(75) Inventors: Samir Chowdhury, Chicago, IL (US); Jinhun Joung, Algunquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 240 days.

(21) Appl. No.: 11/353,649

(22) Filed: Feb. 14, 2006

(65) Prior Publication Data
US 2007/0187611 A1    Aug. 16, 2007

(51) Int. Cl.
*G01T 1/24* (2006.01)
(52) U.S. Cl. .............................. 250/370.14
(58) Field of Classification Search ............ 250/370.14, 250/370.11, 370.09, 370.08; 257/432
See application file for complete search history.

(56) References Cited

U.S. PATENT DOCUMENTS

| | | | |
|---|---|---|---|
| 5,773,829 A * | 6/1998 | Iwanczyk et al. | 250/367 |
| 6,521,894 B1 * | 2/2003 | Iwanczyk et al. | 250/370.11 |
| 6,541,752 B2 * | 4/2003 | Zappa et al. | 250/214.1 |
| 2002/0148967 A1 * | 10/2002 | Iwanczyk et al. | 250/370.11 |
| 2004/0232344 A1 * | 11/2004 | Karplus et al. | 250/370.1 |
| 2005/0012033 A1 * | 1/2005 | Stern et al. | 250/214 R |
| 2006/0033033 A1 * | 2/2006 | Nomura et al. | 250/370.14 |
| 2006/0056581 A1 * | 3/2006 | Hoffman et al. | 378/19 |
| 2006/0175529 A1 * | 8/2006 | Harmon et al. | 250/207 |
| 2006/0202129 A1 * | 9/2006 | Niclass et al. | 250/370.14 |

* cited by examiner

*Primary Examiner*—Christine Sung
*Assistant Examiner*—Faye Boosalis
(74) *Attorney, Agent, or Firm*—Peter L. Kendall

(57) ABSTRACT

An imaging radiation detector includes a scintillator coupled to an array of photodiodes operating in Geiger mode. The array is divided into separate detector pixels, each of which is composed of a multiplicity of photodiode cells with their outputs tied together. While each of the cells operates independently in a binary or digital mode, by tying together the outputs of a multiplicity of adjacent photodiode cells forming a single pixel, the sum of the outputs is proportional to the intensity of generated scintillation photons, similar to the output of a PMT. Appropriate quenching circuitry is provided to rapidly reset the photodiodes after scintillation photon detection.

17 Claims, 4 Drawing Sheets

TIME

TIME

QUANTITATIVE RADIATION DETECTION USING GEIGER MODE AVALANCHE PHOTODIODE BINARY DETECTOR CELL ARRAYS

FIELD OF THE INVENTION

The present invention relates generally to radiation detectors, and in particular to radiation detectors used in medical imaging applications such as nuclear medical and x-ray medical imaging and computed tomography.

BACKGROUND OF THE INVENTION

Gamma ray cameras are well-known devices used to image the distribution and concentration of a radioactive field by detecting gamma ray emissions from radioactive decay. The conventional gamma or "Anger" camera (named after its inventor) is described in U.S. Pat. No. 3,011,057 for RADIATION IMAGE DEVICE, hereby incorporated by reference. The gamma camera typically uses a sodium iodide ("NaI") scintillation crystal to detect gamma ray emissions from a radioactive object. The scintillation crystal is positioned to receive a portion of the gamma ray emissions from the decay of a radioactive isotope within the object. When a gamma photon strikes and is absorbed in the detector crystal, the energy of the gamma ray is converted into a large number of scintillation light photons that emanate from the point of the gamma ray's absorption in the crystal. This basic structure can be used for many different imaging studies, including PET, SPECT and planar imaging.

The gamma camera typically uses an array of photomultiplier tubes (PMTs), optically coupled to the crystal, which detect a fraction of these scintillation light photons and produce an electronic signal that is proportional to the number of incident scintillation light photons detected. The signals from the different photomultiplier tubes in the array are combined to provide an indication of the position and energy of gamma rays incident on the crystal.

Alternatives to the conventional photomultiplier tubes have long been sought for nuclear medical applications, in order to improve image quality and performance characteristics. In particular, photomultiplier tubes are relatively large, bulky, sensitive to magnetic fields, susceptible to linearity distortions, suffer from relatively low quantum efficiency, require a high supply voltage, and are subject to "dead" space between tubes in an array due to the inherent restrictions in the geometric shapes of the photomultiplier tubes and consequent limits in packing density and spatial resolution.

In particular, gamma cameras with solid-state detectors are known in the art. See, e.q., U.S. Pat. Nos. 4,055,765, 6,242, 745, 6,359,281 and 6,921,904. Such solid state detectors take the place of the scintillation crystal and PMT, as the gamma photons are directly absorbed in the semiconductor material and the resultant induced electrical charges are measured at output terminals of the semiconductor detectors. However, such solid state detectors require expensive cooling systems because of the significant heat generated by the absorption of gamma photons in the semiconductor material and resultant electric charge produced therein.

Also known are gamma cameras having photodiode detectors instead of PMTs, coupled to a scintillation crystal. See, e.q., U.S. Pat. Nos. 4,234,792, 5,171,998, and 5,773,829. However, efforts to commercialize such photodiode detectors generally have not been successful, as a result of performance-related issues such as insufficient amplification, lack of stability, and large capacitance.

Therefore, there remains a need in the art for improved an photodetector for use in radiation imaging apparatus such as PET, SPECT, and CT medical applications, as well as other non-medical radiation detection applications.

SUMMARY OF THE INVENTION

The present invention represents an advance in the art, by providing an imaging radiation detector including a scintillator coupled to an array of photodiodes operating in Geiger mode. The array is divided into separate detector pixels, each of which is composed of a multiplicity of photodiode cells with their outputs tied together. While each of the cells operates independently in a binary or digital mode, by tying together the outputs of a multiplicity of adjacent photodiode cells forming a single pixel, the sum of the outputs is proportional to the intensity of generated scintillation photons, similar to the output of a PMT. Appropriate quenching circuitry is provided to rapidly reset the photodiodes after scintillation photon detection.

According to one aspect of the invention, a radiation detector is includes a scintillator, an array of photodiode detector cells optically coupled to the scintillator, each of the photodiode cells being reverse-biased above a breakdown voltage thereof, wherein the photodiode detector cells are divided into a plurality of pixels of the radiation detector, each of the pixels including a subset of photodiode detector cells of the array, with individual output signals of photodiodes in each subset being summed to provide a single cumulative output signal, wherein the cumulative output signal corresponds to an intensity of incident photons striking the pixel.

According to another aspect of the invention, a photon counter includes a first plurality of photodiodes each being reverse-biased above a breakdown voltage thereof, a common output at which individual output signals of the plurality of photodiodes are summed to provide a single cumulative output signal, wherein the individual output signals correspond to detection of a single photon, and the cumulative output signal corresponds to an intensity of incident photons striking the plurality of photodiodes.

BRIEF DESCRIPTION OF THE DRAWINGS

These and other features and advantages of the present invention are more fully described in the following attached drawings, in which.

DETAILED DESCRIPTION OF THE PREFERRED EMBODIMENTS

Figure 1:
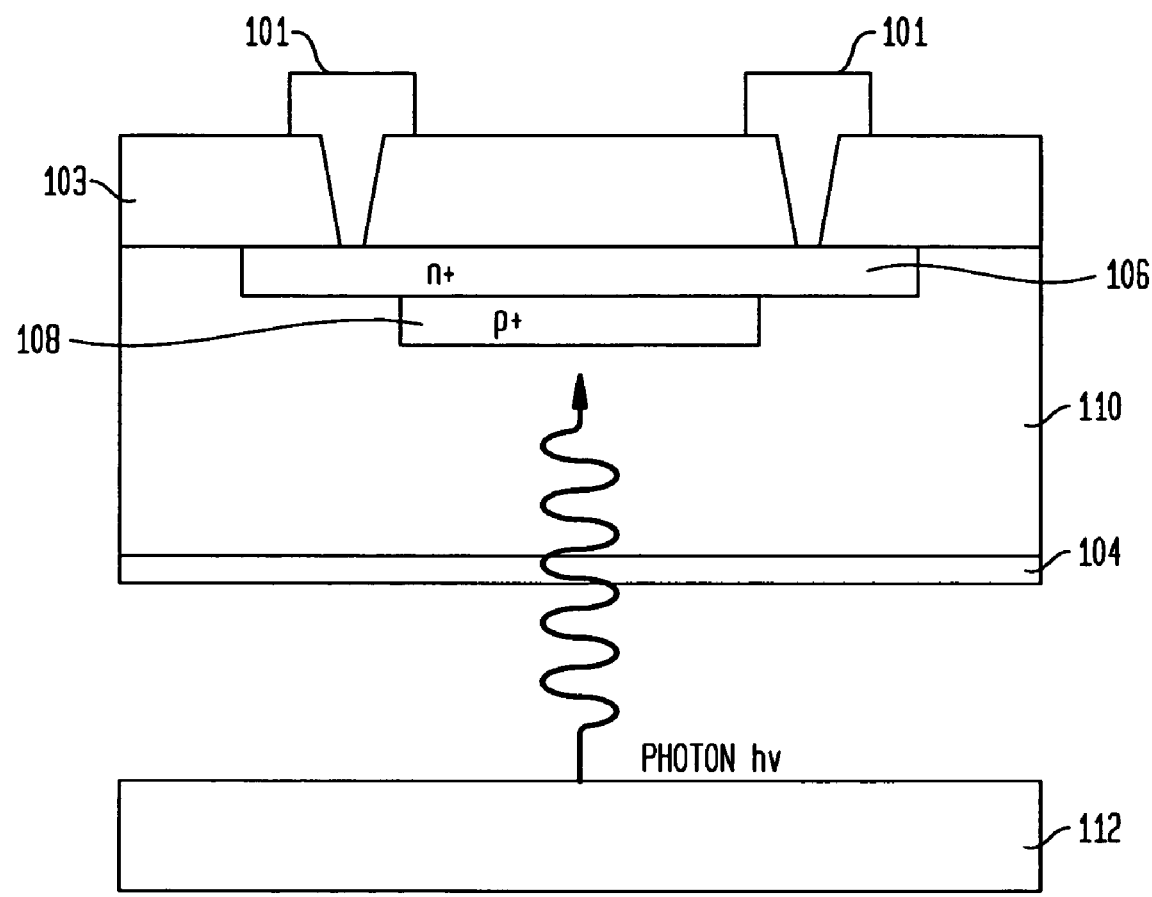
FIG. 1 is a diagram of the basic structure of a photodiode detector cell, according to one example embodiment of the invention.
Figure 2:
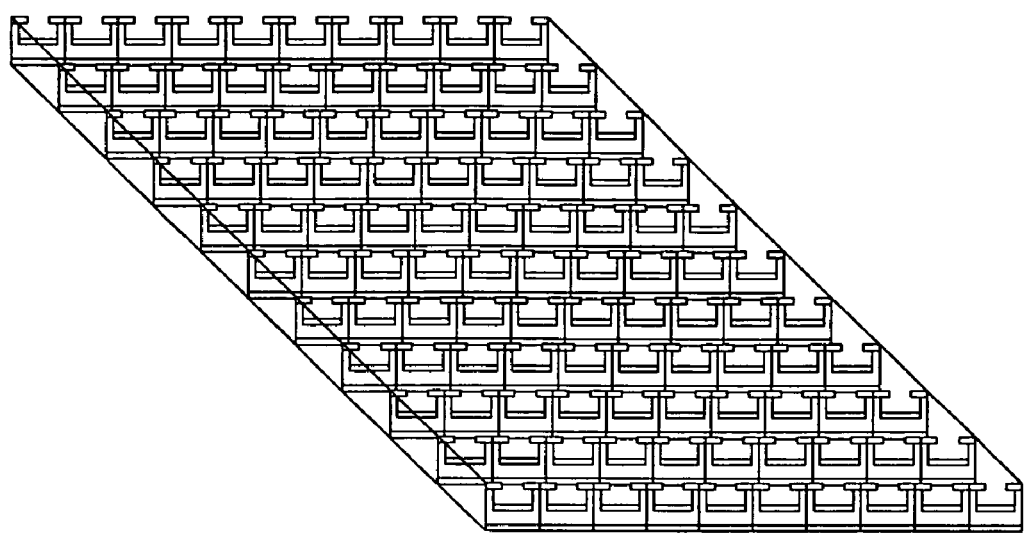
FIG. 2 is a diagram depicting an array of photodiode detector cells according to one example embodiment of the invention.

FIG. 1 is a diagram showing the basic structure of an example photodiode detector cell in accordance with the invention, and FIG. 2 illustrates an array of cells, which is coupled to a scintillator to form a radiation detector. The cell contains a shallow p-n junction formed by a p-type substrate 110 and a heavily doped n-type layer 106. Heavily doped p-type layer 108 is formed in the substrate below the n-type layer 106. P-type layer 108 creates a sheet of charge that divides the cell structure into a low electric field region below layer 108, wherein photon absorption occurs, and a high electric field region above layer 108 wherein impact ionization occurs. Metal electrodes 101 contact the n-type layer 106 through an insulation layer 103. Metal contact layer 104 is provided on the opposite side of the substrate 110.

In accordance with the invention, the photodiode cell is operated in Geiger mode, which is fundamentally a digital mode of operation. Specifically, the photodiode cell is reverse-biased by applying a reverse-bias voltage across the cell at metal contacts 101, 104. This voltage creates an electric field at the p-n junction that keeps electrons in the n side of the junction and holes in the p side of the junction. When a photon hv is absorbed in the cell, an electron-hole pair is generated. In an application of the invention relating to radiation imaging, photons are emitted by a scintillation crystal 112 in response to scintillation "events" or interactions of gammas with the scintillation crystal, as shown in FIG. 1.

The electric field causes the electron to drift to the n side and the hole to drift to the p side, creating a current. When the photodiode is reverse-biased above the breakdown voltage of the p-n junction, the electron (or hole) generated by photon absorption is accelerated by the higher electric field and collides with other particles in the semiconductor lattice to generate additional electron-hole pair, which themselves also experience collisions resulting in formation of still more electron-hole pairs, etc., such that an "avalanche" current is generated.

Figure 3:
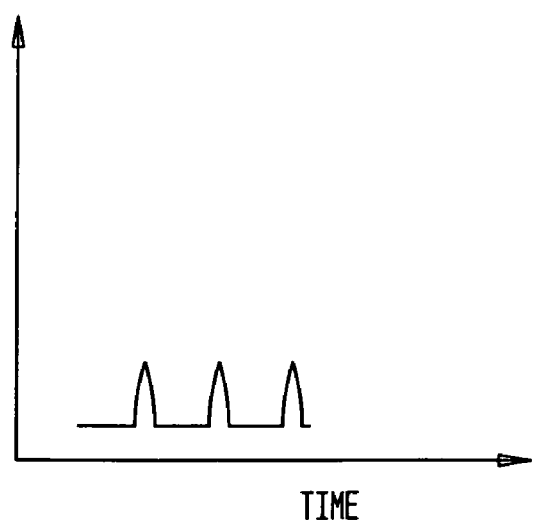
FIG. 3 is a graph illustrating the digital or binary output waveform of a single photodiode detector cell in accordance with the invention.

Thus, in contrast to a photodiode operating in linear mode (which produces a single electron-hole pair for each photon absorbed in the photodiode), the Geiger mode avalanche photodiode will produce a large current spike in response to the absorption of a single photon in the active region of the photodiode. By using an appropriate quenching circuit, the breakdown event can be quickly reset, thereby producing a train of digital pulses as shown in FIG. 3, each of which indicates the detection of a single photon.

Figure 4:
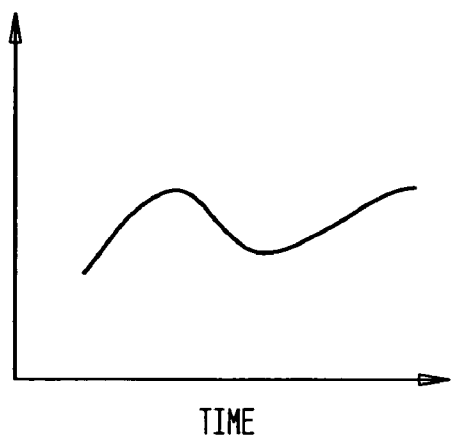
FIG. 4 is a graph illustrating-the analog or cumulative output waveform of an array of photodiode detector cells forming a single pixel of a scintillation detector in accordance with the present invention.
Figure 5:
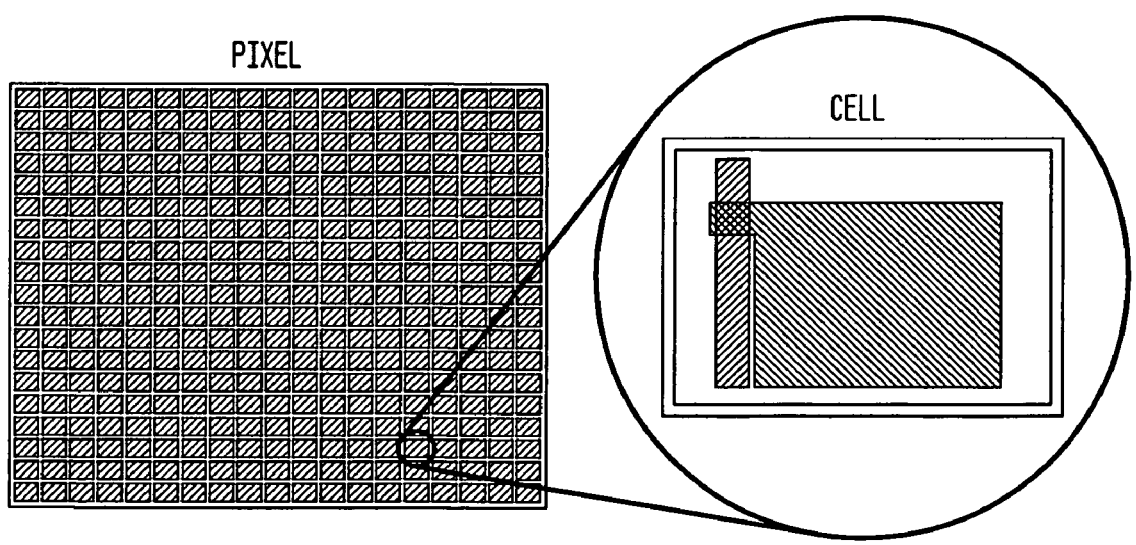
FIG. 5 is a diagram illustrating the composition of a single pixel of a scintillation detector according to one example embodiment of the invention as being made up of a multiplicity of photodiode detector cells.

According to the invention, as shown in FIG. 5, an array of Geiger mode photodiode cells is provided, forming a single pixel of a scintillation radiation detector. The single pixel is formed by joining the cells together on a common semiconductor substrate, with outputs of the cells being tied together at a common output terminal. The signal at the common output terminal is thus the sum of the outputs of each of the cells forming the pixel, to thereby provide an analog signal as shown in FIG. 4. The analog signal is proportional to the intensity of photons interacting with the photodiode cells of the pixel, and is thus similar to the output signal of a PMT as conventionally used in nuclear-medical imaging systems such as PET and SPECT systems.

Figure 6A:
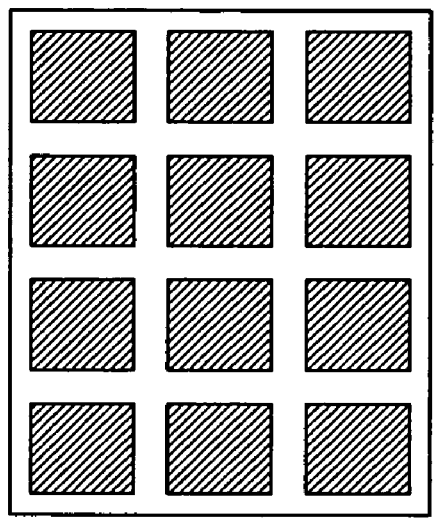
FIGS. 6A-6C illustrate various examples of different pixel configurations in accordance with the invention.
Figure 6B:
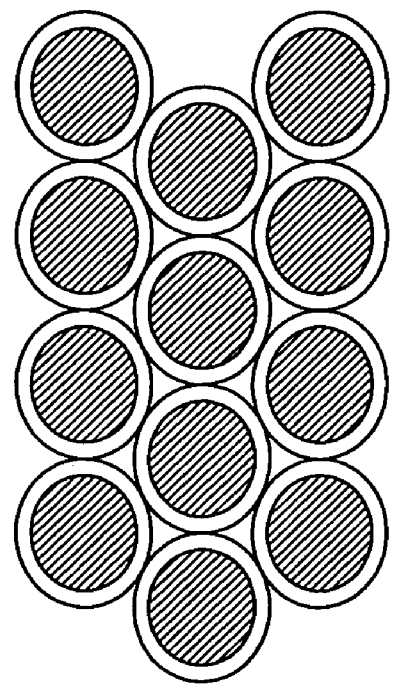
Figure 6C:
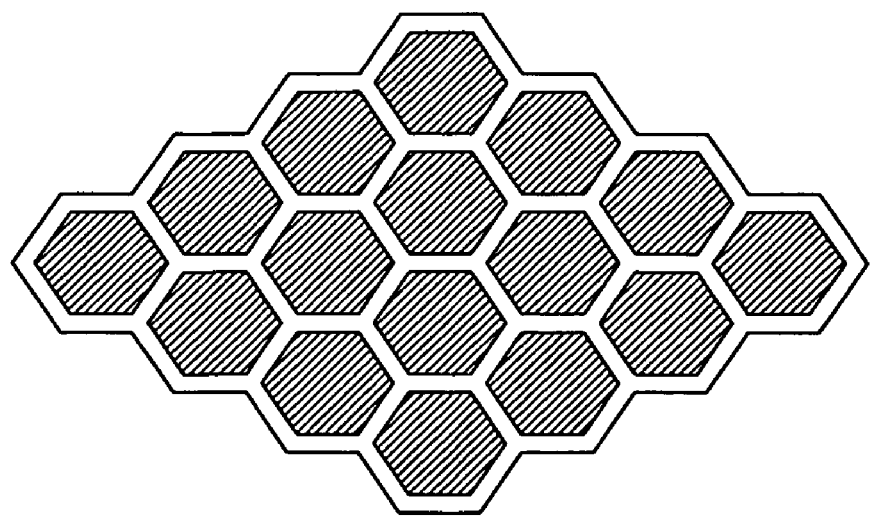

According to one example embodiment of the invention, each cell is on the order of 10 to 20 microns in area, providing greater than 2,500 cells per $mm^2$, with larger cells being possible. Each cell operates as an independent photon counter with a gain on the order of $10^6$, which is the same order as the gain of a conventional PMT. The geometry of the photodiode cells can be varied to create pixels of different shapes, such as square/rectangular as shown in FIG. 6A, circular as shown in FIG. 6B, or hexagonal as shown in FIG. 6C.

As discussed above, in order to operate as a digital photon counter, the occurrence of a breakdown event in each cell must be rapidly quenched and the cell reset. While many quenching circuit designs are known, in accordance with the invention it is presently desired to keep the quenching circuit as simple as possible while still providing the required functionality. Hence a simple, passive quenching circuit in the form of an on-chip resistor for each cell is contemplated, which enables the required functionality to be obtained. Alternatively, other possible designs include individual cell addressability, on-cell circuitry and on-chip circuitry, to allow individual cell readout and simplification of the reading out of the output signals.

Where there is individual cell readout, the "common output" may be a storage medium wherein output pulses from each cell are accumulated so as to provide a value proportional to the magnitude of photons detected by the array. Each memory area of the storage medium would correspond to a single pixel of the detector.

The present invention thus retains the high gain capability of a PMT while providing all of the benefits of photodiode detectors. In addition to being suitable as a replacement for PMTs in PET and SPECT imaging systems, the invention also has potential use in medical x-ray and computed tomography applications, as well as non-medical radiation detection applications.

Among the benefits of the invention for PET/SPECT systems, the present invention provides better image quality in terms of improved spatial and energy resolution, and improved timing resolution (TOF) for 3D image quality; facilitated system manufacture as a result of the sensors not being susceptible to damage by excess light; simpler system operation by virtue of the elimination of daily calibration of sensors; simpler system design by virtue of lower voltage requirements, less heat generation and consequently reduced cooling requirements and infrastructure, more portable systems as a result of smaller and lighter sensors, and less pixel dead space by virtue of tighter packing capability; and better performance cost by virtue of process technology being tied to improvements in semiconductor fabrication techniques, quality and cost reductions (which are constantly experiencing improvement in the field). Table 1 illustrates a comparison of the features of the Digital Photon Counter (DPC) of the present invention with conventional PMT and APD technologies.

TABLE 1

| | PMT | APD | DPC |
|---|---|---|---|
| Dynamic Range | Large | Very Large | 1 to 500,000,000 photons/sec |
| Gain | $10^6$ | 100(s) | $10^6$ |
| Quantum Efficiency | Peaking at 20% | <50% | Potentially >85% |
| Timing | ns | ns | <50 ps |
| Dead Time (cell) | N/a | N/a | <50 ns |
| Fill Factor | >80% | 100% | >80% |
| Noise | low | high | Very low |
| Voltage Applied (v) | 1000(s) | 100(s) | <35 |
| Other | Highly susceptible to magnetic fields | Not susceptible to magnetic fields | Not susceptible to magnetic fields |
| | Large & bulky | Small | Small |

The invention having been described, it will be apparent to those skilled in the art that the same may be varied in many ways without departing from the spirit and scope of the invention. Any and all such modifications are intended to be included within the scope of the following claims.

What is claimed is:

1. A photon counter, comprising:
   a first plurality of photodiodes each being reverse-biased above a breakdown voltage thereof;
   a common output at which individual output signals of said plurality of photodiodes are summed to provide a single cumulative output signal, wherein said individual output signals correspond to detection of a single photon, and said cumulative output signal corresponds to an intensity of incident photons striking said plurality of photodiodes.

2. The photon counter of claim 1, wherein said common output comprises an output terminal at which individual outputs of each of said plurality of photodiodes are tied.

3. The photon counter of claim 1, wherein said common output comprises a storage medium that accumulates output signals from each of said plurality of photodiodes.

4. The photon counter of claim 1, further comprising a second plurality of photodiodes, and a second common output at which individual output signals of said second plurality of photodiodes are summed.

5. The photon counter of claim 4, wherein said first and second pluralities of photodiodes each correspond to a respective pixel of a radiation imaging detector.

6. The photon counter of claim 5, wherein said radiation imaging detector corresponds to a PET detector.

7. The photon counter of claim 5, wherein said radiation imaging detector corresponds to a SPECT detector.

8. A radiation detector, comprising:
   a scintillator;
   an array of photodiode detector cells optically coupled to said scintillator, each of said photodiode cells being reverse-biased above a breakdown voltage thereof;
   wherein said photodiode detector cells are divided into a plurality of pixels of said radiation detector, each of said pixels comprising a subset of photodiode detector cells of said array, with individual output signals of photodiodes in each subset being summed to provide a single cumulative output signal, wherein said cumulative output signal corresponds to an intensity of incident photons striking said pixel.

9. The radiation detector of claim 8, wherein said individual output signals of photodiodes in each subset are tied together at a common output terminal.

10. The radiation detector of claim 8, wherein said individual output signals of photodiodes in each subset are accumulated in a storage medium.

11. The radiation detector of claim 8, wherein said radiation detector corresponds to a PET detector.

12. The radiation detector of claim 8, wherein said radiation detector corresponds to a SPECT detector.

13. A scintillation imaging detector having a plurality of pixels, each pixel comprising a plurality of photodiodes each being reverse-biased above a breakdown voltage thereof, and each pixel having a common output at which individual output signals of said plurality of photodiodes are summed to provide a single cumulative output signal.

14. The scintillation imaging detector of claim 13, wherein said common output comprises an output terminal at which individual outputs of each of said plurality of photodiodes are tied.

15. The scintillation imaging detector of claim 13, wherein said common output comprises a storage medium that accumulates output signals from each of said plurality of photodiodes.

16. The scintillation imaging detector of claim 13, wherein said imaging detector corresponds to a PET detector.

17. The scintillation imaging detector of claim 13, wherein said imaging detector corresponds to a SPECT detector.

* * * * *